(12) United States Patent
Nishitani et al.

(10) Patent No.: US 7,847,445 B2
(45) Date of Patent: Dec. 7, 2010

(54) ALTERNATOR

(75) Inventors: Shoichiro Nishitani, Chiyoda-ku (JP); Atsushi Oohashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/089,547

(22) PCT Filed: Jan. 25, 2007

(86) PCT No.: PCT/JP2007/051169

§ 371 (c)(1),
(2), (4) Date: Apr. 8, 2008

(87) PCT Pub. No.: WO2008/090616

PCT Pub. Date: Jul. 31, 2008

(65) Prior Publication Data

US 2010/0156206 A1  Jun. 24, 2010

(51) Int. Cl.
*H02K 9/00* (2006.01)

(52) U.S. Cl. .......................... 310/52; 310/68 D; 310/71

(58) Field of Classification Search ............. 310/52–59, 310/71, 68 D, 64, 263
See application file for complete search history.

(56) References Cited

U.S. PATENT DOCUMENTS

| 3,970,881 | A | * | 7/1976 | Sato ..................... 310/68 D |
| 5,729,063 | A | | 3/1998 | Adachi et al. |
| 5,821,674 | A | * | 10/1998 | Weiner .................. 310/68 D |
| 6,784,576 | B2 | * | 8/2004 | Nguyen ................. 310/68 D |
| 6,812,604 | B2 | * | 11/2004 | Braun et al. ........... 310/68 D |
| 2007/0040531 | A1 | | 2/2007 | Oohashi et al. |
| 2007/0176501 | A1 | * | 8/2007 | Nishimura et al. ...... 310/68 R |
| 2007/0222311 | A1 | * | 9/2007 | Vasilescu ................ 310/58 |
| 2008/0054766 | A1 | * | 3/2008 | Kondo ................... 310/68 D |

FOREIGN PATENT DOCUMENTS

| CN | 1128427 A | 8/1996 |
| JP | 04-026346 A | 1/1992 |
| JP | 05-268749 A | 10/1993 |
| JP | 08-182279 A | 7/1996 |
| JP | 08-331817 A | 12/1996 |
| JP | 2001-333558 A | 11/2001 |
| WO | 2006/033136 A1 | 3/2006 |

\* cited by examiner

*Primary Examiner*—Thanh Lam
(74) *Attorney, Agent, or Firm*—Sughrue Mion, PLLC

(57) ABSTRACT

A rectifier of an alternator according to the present invention includes: a first heat sink; first unidirectional conducting element bodies that are disposed on a front surface of the first heat sink so as to be spaced apart; a second heat sink that is disposed so as to be separated from the first heat sink; second unidirectional conducting element bodies that are disposed on a front surface of the second heat sink so as to be spaced apart; and a circuit board that has a circuit board terminal by which the first unidirectional conducting element bodies and the second unidirectional conducting element bodies are connected so as to constitute a bridge circuit, and a terminal connection portion is configured by respectively connecting first terminals of the first unidirectional conducting element bodies and second terminals of the second unidirectional conducting element bodies adjacently in a common plane with the circuit board terminal. Thus, connection workability between the first terminals of first unidirectional conducting element bodies and the circuit board terminal and between the second terminals of second unidirectional conducting element bodies and the circuit board terminal is improved.

10 Claims, 5 Drawing Sheets

ALTERNATOR

TECHNICAL FIELD

The present invention relates to an alternator that includes a rectifier that rectifies into direct current alternating current that has been generated in a stator of an automotive alternator that can be mounted to a vehicle, for example.

BACKGROUND ART

Conventional automotive alternators are known that include: a case; a rotor that is disposed inside the case so as to be fixed to a shaft and that also has a fan on an end portion; a stator that is disposed so as to surround the rotor and in which alternating current arises due to a rotating magnetic field from the rotor; and a rectifier that is disposed near an end portion of the shaft and that rectifies the alternating current that arises in the stator, wherein the rectifier includes: a first heat sink; first unidirectional conducting element bodies that are disposed on a front surface of the first heat sink so as to be spaced apart; a second heat sink that is disposed radially outside the first heat sink; second unidirectional conducting element bodies that are disposed on a front surface of the second heat sink so as to be spaced apart; and a circuit board that has terminals that connect the first unidirectional conducting element bodies and the second unidirectional conducting element bodies so as to form a bridge circuit (see Patent Literature 1, for example).

In this example, radially inner end portions of the terminals are bent axially toward the rotor, first terminals of the first unidirectional conducting element bodies that have been led out are welded to first surfaces of the circuit board terminals on a side near the shaft, and second terminals of the second unidirectional conducting element bodies that have been led out are welded to second surfaces of the circuit board terminals on an opposite side from the shaft.

A molded resin portion and the terminals of the circuit board are configured so as to be integrated, but the radially inner end portions of the circuit board terminals project radially inward from the molded resin portion.

Patent Literature 1
WO 2006/033136 (Gazette: FIG. 1)

DISCLOSURE OF THE INVENTION

Problem to be Solved by the Invention

In conventional automotive alternator rectifiers, since the first terminals of the first unidirectional conducting element bodies are fixed by welding after being positioned at predetermined positions on the first surfaces of the circuit board terminals, and then the second terminals of the second unidirectional conducting element bodies are fixed by welding after being positioned at predetermined positions on the second surfaces of the circuit board terminals, one problem has been that two surfaces of the circuit board terminals have been used to connect the first terminals and the second terminals with the circuit board terminals, making connection workability poor.

Because the radially inner end portions of the circuit board terminals project radially inward from the molded resin portion, another problem has been that resistance from projecting portions of the circuit board terminals to cooling airflows that are generated by rotation of the fan that is fixed to the end surface of the rotor is increased, reducing cooling performance of the first unidirectional conducting element bodies and the second unidirectional conducting element bodies, and increasing wind noise.

The present invention aims to solve problems such as those mentioned above and provides an alternator in which connection workability between first terminals of first unidirectional conducting element bodies and a circuit board terminal and between second terminals of second unidirectional conducting element bodies and the circuit board terminal is improved, and in which resistance to cooling airflows that are generated by rotation of a fan and wind noise are reduced.

Means for Solving the Problem

In order to achieve the above object, according to one aspect of the present invention, there is provided an alternator including: a case; a rotor that is disposed inside the case, that is fixed to a shaft, and that has a fan that is disposed on an axial end portion; a stator that is disposed so as to surround the rotor and in which alternating current is generated due to a rotating magnetic field from the rotor; and a rectifier that is disposed near an end portion of the shaft and that rectifies the alternating current that is generated in the stator, the alternator being characterized in that: the rectifier includes: a first heat sink; first unidirectional conducting element bodies that are disposed on a front surface of the first heat sink so as to be spaced apart; a second heat sink that is disposed so as to be separated from the first heat sink; second unidirectional conducting element bodies that are disposed on a front surface of the second heat sink so as to be spaced apart; and a circuit board that has a circuit board terminal by which the first unidirectional conducting element bodies and the second unidirectional conducting element bodies are connected so as to constitute a bridge circuit; and a terminal connection portion is configured by respectively connecting first terminals of the first unidirectional conducting element bodies that have been led out and second terminals of the second unidirectional conducting element bodies that have been led out adjacently in a common plane with the circuit board terminal.

Effects of the Invention

In an alternator according to the present invention, connection workability between the first terminals of first unidirectional conducting element bodies and the circuit board terminal and between the second terminals of second unidirectional conducting element bodies and the circuit board terminal is improved, and resistance to cooling airflows that are generated by rotation of the fan and wind noise are reduced.

BEST MODE FOR CARRYING OUT THE INVENTION

Figure 1:
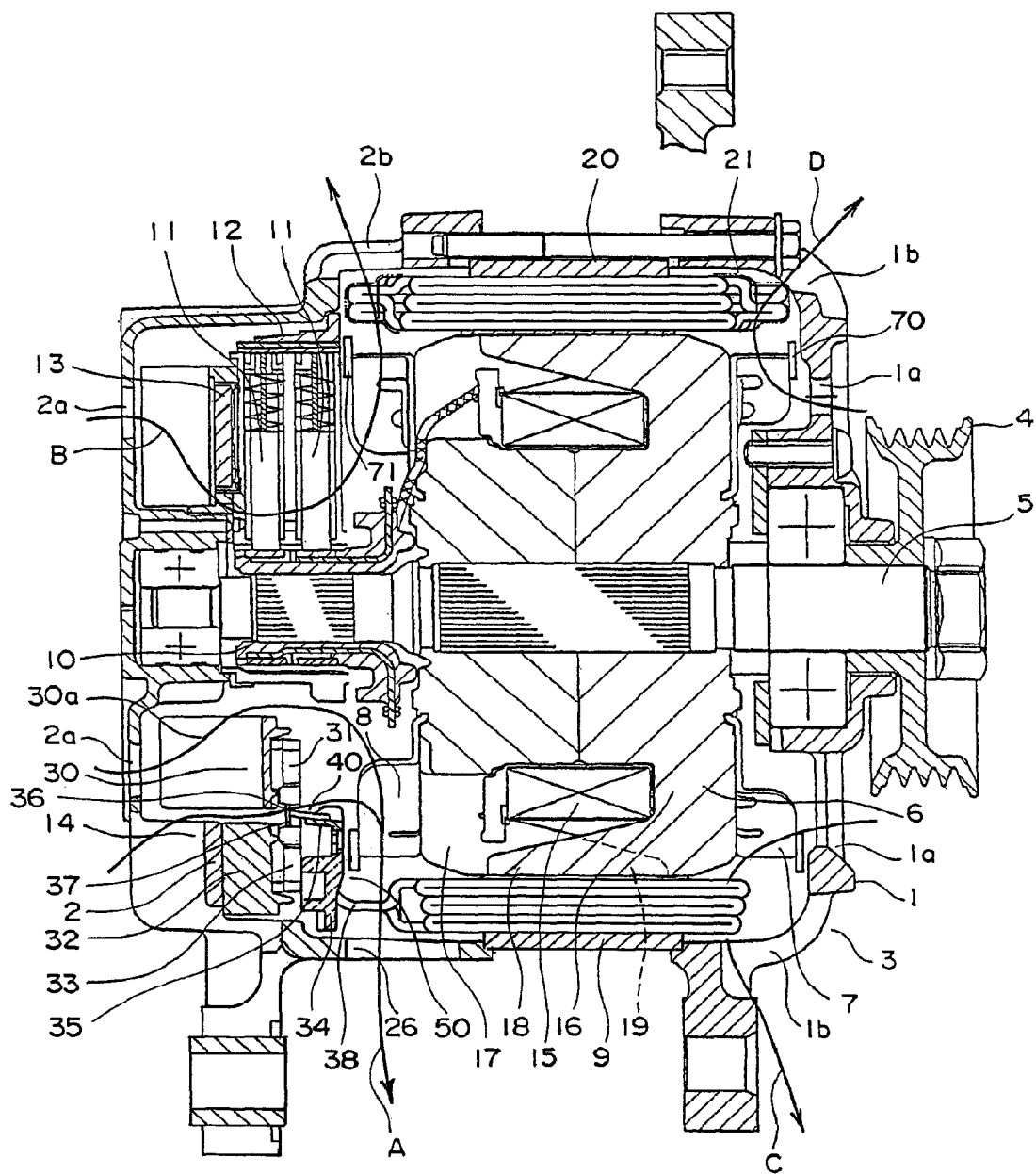
FIG. 1 is a lateral cross section of an automotive alternator according to Embodiment 1 of the present invention.

A preferred embodiment of the present invention will now be explained based on the drawings, and identical or corresponding members and portions in the drawings will be given identical numbering.

Embodiment 1

Figure 2:
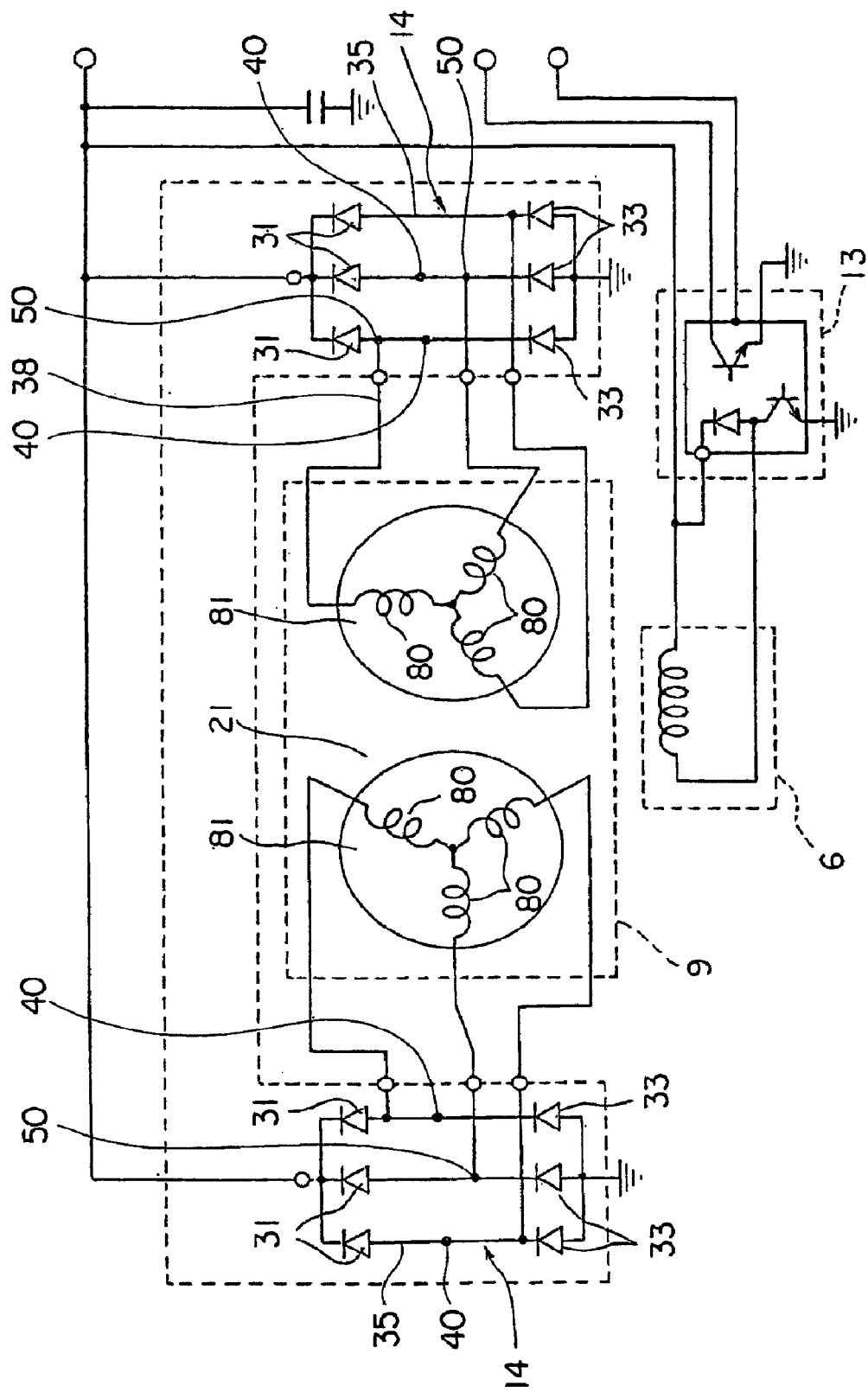
FIG. 2 is an electrical circuit diagram for the automotive alternator in FIG. 1.
Figure 3:
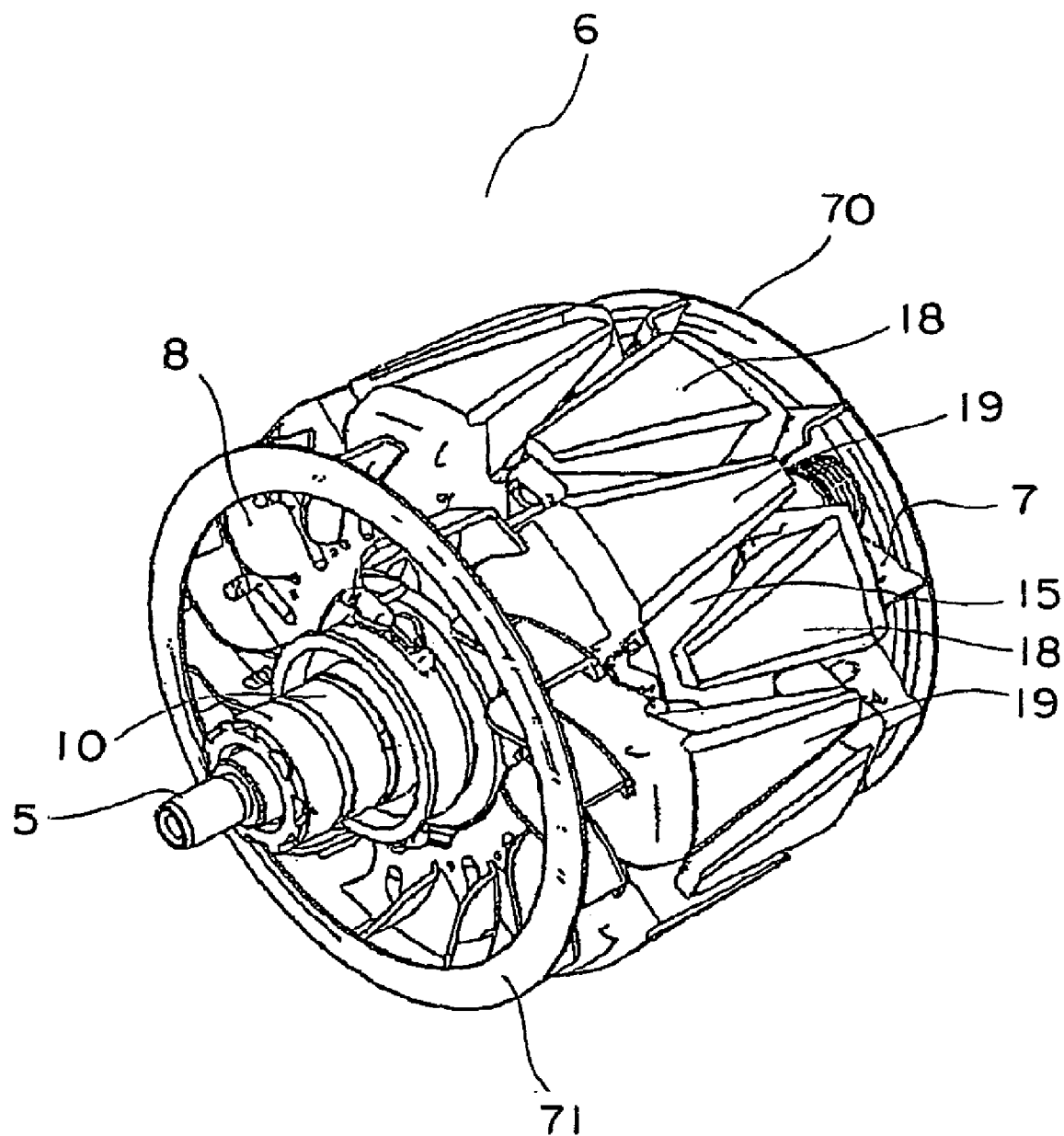
FIG. 3 is a perspective that shows a rotor from FIG. 1.

FIG. 1 is a lateral cross section of an automotive alternator (hereinafter simply "alternator") according to Embodiment 1 of the present invention, FIG. 2 is an electrical circuit diagram for the alternator in FIG. 1, and FIG. 3 is a perspective that shows a rotor 6 from FIG. 1.

In an alternator, a shaft 5 that has a pulley 4 fixed to a first end portion is rotatably disposed inside a case 3 that is constituted by a front bracket 1 and a rear bracket 2 that are made of aluminum. A Lundell rotor 6 is fixed to the shaft 5. A stator 9 is fixed to an inner wall surface of the case 3 around a circumference of the rotor 6 so as to surround the rotor 6.

Slip rings 10 that supply electric current to the rotor 6 are fixed to a second end portion of the shaft 5. A pair of brushes 11 that are housed inside a brush holder 12 slide in contact with surfaces of the slip rings 10.

A voltage regulator 13 that adjusts magnitude of alternating voltage generated in the stator 9 is fixed to the brush holder 12. Rectifiers 14 that are electrically connected to the stator 9 so as to rectify alternating current into direct current are also disposed inside the rear bracket 2.

A plurality of front-end suction apertures 1a are formed on a radially-inner side of the front bracket 1 and a plurality of front-end discharge apertures 1b are formed on a radially-outer side. A plurality of rear-end suction apertures 2a are formed on a radially-inner side of the rear bracket 2 and a plurality of rear-end discharge apertures 2b are formed on a radially-outer side.

The above rotor 6 includes: a rotor coil 15 that generates magnetic flux on passage of electric current; a pole core that is disposed so as to cover the rotor coil 15; a front-end fan 7 that is fixed to an end surface of the pole core near the pulley 4; and a rear-end fan 8 that is fixed to an end surface on an opposite side of the pole core from the pulley 4. The pole core includes a front-end pole core body 16 and a rear-end pole core body 17 that are magnetized into North-seeking (N) poles and South-seeking (S) poles by the magnetic flux. The front-end pole core body 16 and the rear-end pole core body 17 have front-end claw-shaped magnetic poles 18 and rear-end claw-shaped magnetic poles 19, respectively, that are claw-shaped and intermesh with each other. An annular plate 70 is disposed on an end portion of the front-end fan 7 near the pulley 4. An annular plate 71 is disposed on an end portion of the rear-end fan 8 near the rectifiers 14.

The above stator 9 includes: a stator core 20 through which a rotating magnetic field from the rotor 6 passes; and a stator coil 21 that is disposed radially inside the stator core 20. A plurality of slots that are formed so as to extend axially are disposed at a uniform pitch around an entire circumference on a radially inner side of the stator core 20, which is configured by laminating steel sheets.

As shown in FIG. 2, the stator coil 21 is constituted by two three-phase alternating-current windings 81 in each of which three winding portions 80 are three-phase wye connected, and the two three-phase alternating-current windings 81 have a phase difference of 30 electrical degrees from each other.

Figure 4:
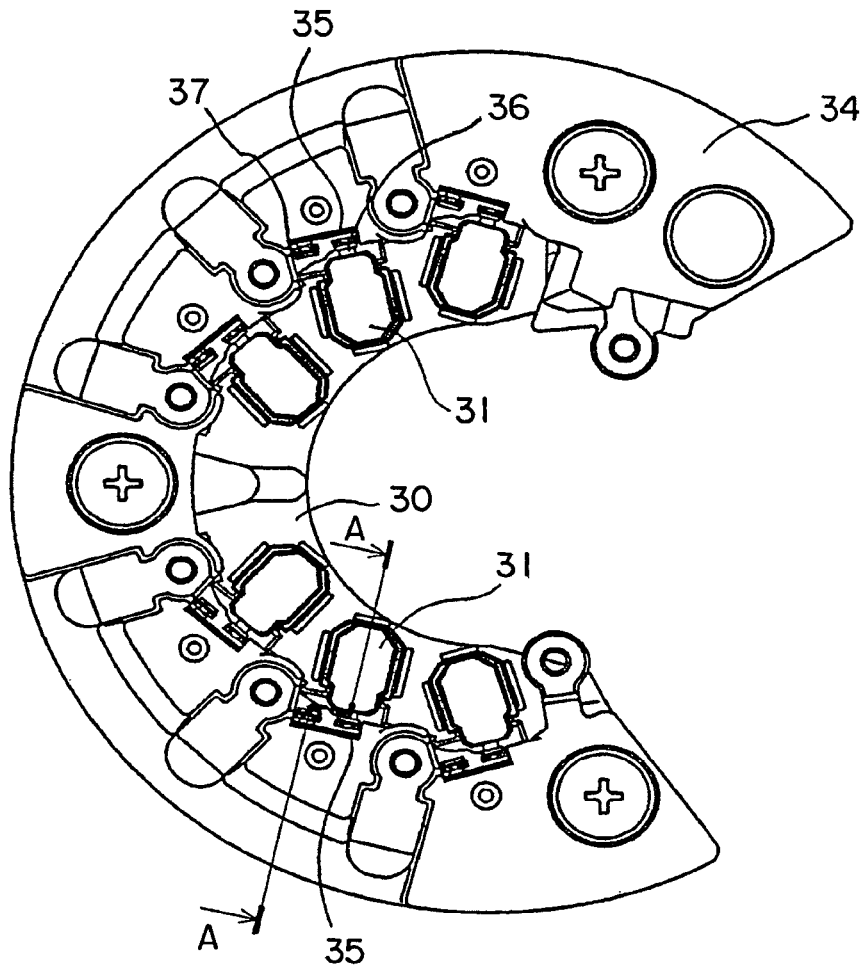
FIG. 4 is a front elevation of a rectifier from FIG. 1 when viewed from a front end of the automotive alternator before a welding step.

As shown in FIG. 4, the above rectifiers 14 include: a horseshoe-shaped aluminum positive-side first heat sink 30; rectangular parallelepipedic first unidirectional conducting element bodies 31 that are disposed on a front surface of the first heat sink 30 so as to be spaced apart circumferentially; a horseshoe-shaped aluminum negative-side second heat sink 32 that is disposed radially outside the first heat sink 30; rectangular parallelepipedic second unidirectional conducting element bodies 33 that are disposed on a front surface of the second heat sink 32 so as to be spaced apart circumferentially; and a horseshoe-shaped circuit board that is disposed so as to cover the second unidirectional conducting element bodies 33.

A plurality of radiating fins 30a are formed in a radial pattern on a rear surface of the aluminum first heat sink 30. The first unidirectional conducting element bodies 31 are formed by insertion molding diodes using an insulating resin. A portion of a rear surface of the aluminum second heat sink 32 is placed in surface contact with the rear bracket 2. The second unidirectional conducting element bodies 33 are formed by insertion molding diodes using an insulating resin.

A molded resin portion 60 of the circuit board 34 and a plurality of circuit board terminals 35 that are disposed on an edge surface of the molded resin portion 60 are integrated by insertion molding. The first unidirectional conducting element bodies 31 and the second unidirectional conducting element bodies 33 are connected by these circuit board terminals 35 so as to constitute a bridge circuit, and the two rectifiers 14 are connected in parallel electrically. The stator coil 21 and the rectifiers 14 are also connected by the circuit board terminals 35.

As shown in FIG. 1, radially inner end portions of the circuit board terminals 35 are bent toward the first unidirectional conducting element bodies 31 and the second unidirectional conducting element bodies 33. First terminals 36 of the first unidirectional conducting element bodies 31 and second terminals 37 of the second unidirectional conducting element bodies 33 are connected adjacently to inner surfaces of the radially inner end portions of the circuit board terminals 35.

A terminal connection portion 40 that is formed by connecting each of the first terminals 36 of the first unidirectional conducting element bodies 31 and the second terminals 37 of the second unidirectional conducting element bodies 33 adjacently in a common plane with the circuit board terminals 35 faces the rear-end fan 8.

Figure 5:
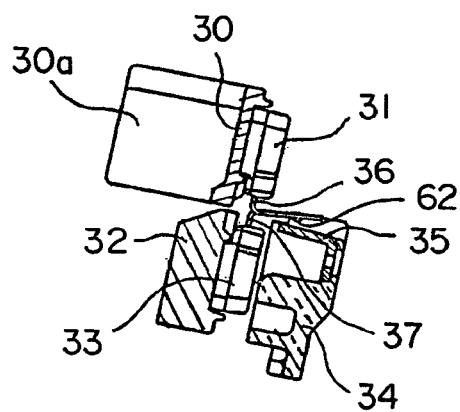
FIG. 5 is a cross section that is taken along line A-A in FIG. 4 so as to be viewed in the direction of the arrows.

FIG. 5 is a cross section that is taken along line A-A in FIG. 4 so as to be viewed in the direction of the arrows.

The first unidirectional conducting element bodies 31 are joined to a recess portion of the first heat sink 30 by brazing using a solder. The first terminals 36 of the first unidirectional conducting element bodies 31 are connected to the circuit board terminals 35 by resistance welding through lugs 62.

The second unidirectional conducting element bodies 33 are joined to a recess portion of the second heat sink 32 by brazing using a solder. The second terminals 37 of the second unidirectional conducting element bodies 33 are also connected to the circuit board terminals 35 by resistance welding through lugs.

Figure 6:
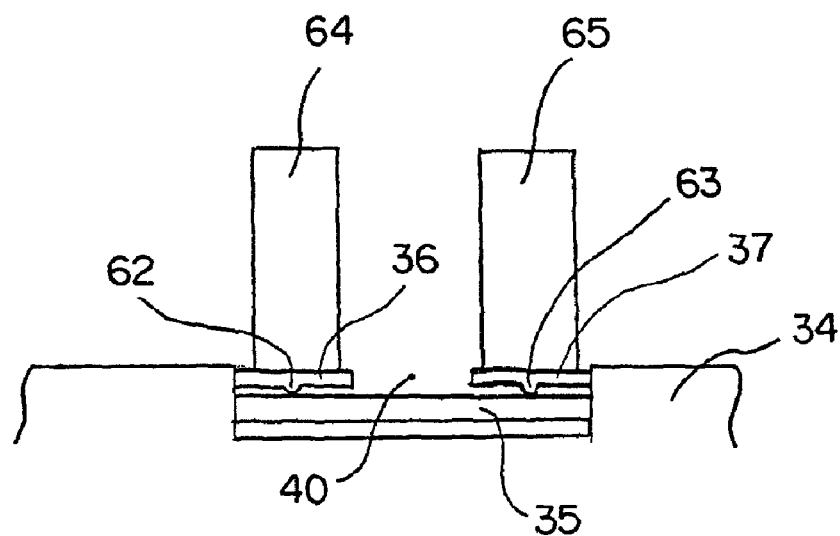
FIG. 6 is a partial front elevation of the rectifier from FIG. 1 when viewed from a side near the rotor before the welding step.

Next, resistance welding between the first terminals 36 of the first unidirectional conducting element bodies 31 and the circuit board terminals 35 and between the second terminals 37 of the second unidirectional conducting element bodies 33 and the circuit board terminals 35 will be described in detail based on FIGS. 6 and 7.

The circuit board 34 is formed such that radially inner end portions of the circuit board terminals 35 are inclined at a predetermined angle so as to facilitate mold removal during insertion molding. Consequently, the first terminals 36 and the second terminals 37 are respectively inclined at predetermined angles and separated from the radially inner end portions so as not to collide with the radially inner end portions of the circuit board terminals 35 during assembly.

Figure 7:
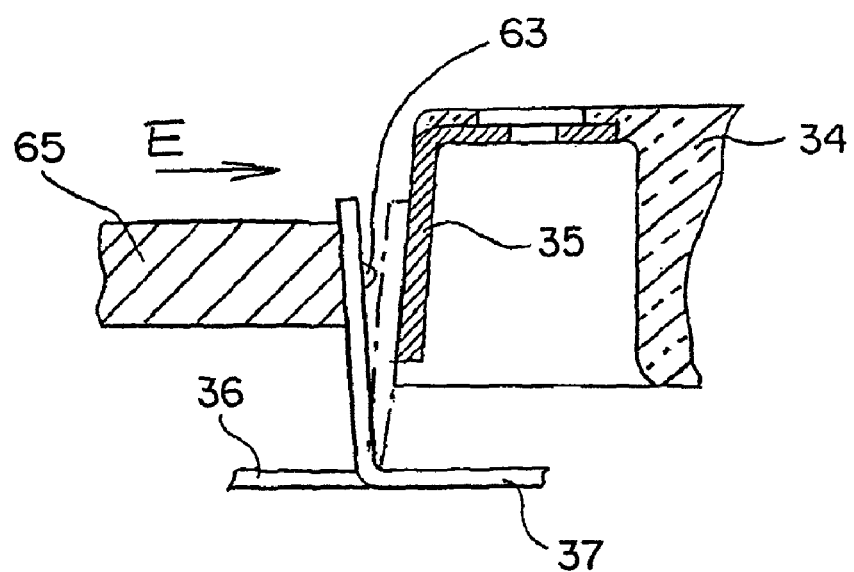
FIG. 7 is a partial cross section that shows the rectifier from FIG. 1 during the welding step.

In this assembled state, positive electrodes 64 are placed in contact with the first terminals 36 and negative electrodes 65 are placed in contact with the second terminals 37 and moved in the direction of arrow E in FIG. 7 so as to press the respective lugs 62 and 63 of the terminals 36 and 37 onto the radially inner end portions of the circuit board terminals 35. Current from a power source (not shown) is subsequently passed to the respective electrodes 64 and 65 through the lugs 62 and 63, and the respective terminals 36 and 37 and the circuit board terminals 35 are melted and welded starting at the lugs 62 and 63.

In an automotive alternator that has the above configuration, electric current is supplied from a battery (not shown) through the brushes 11 and the slip rings 10 to the rotor coil 15, generating magnetic flux and giving rise to North-seeking (N) poles and South-seeking (S) poles in the front-end and rear-end claw-shaped magnetic poles 18 and 19, respectively.

At the same time, since the pulley 4 is driven by an engine and the rotor 6 is rotated by the shaft 5, a rotating magnetic field is applied to the stator core 20, giving rise to electromotive force in the stator coil 21.

Magnitude of the alternating-current electromotive force is adjusted by the voltage regulator 13, and also passes through the rectifiers 14 and is rectified into direct current, and the battery is charged.

Due to rotation of the rear-end fan 8 that is fixed to the end surface of the rotor 6, external air is drawn in near the rear bracket 2 through the rear-end suction apertures 2a, and as indicated by arrows A in FIG. 1, cools the rectifiers 14, then cools the terminal connection portion 40 and coil ends of the stator coil 21, and is then discharged externally through the rear-end discharge apertures 2b. As indicated by arrow B in FIG. 1, external air also cools the voltage regulator 13, then cools the stator coil 21, and is then discharged externally through the rear-end discharge apertures 2b.

As indicated by arrows C and D in FIG. 1, near the front bracket 1, external air is also drawn in through the front-end suction apertures 1a, is deflected centrifugally by the front-end fan 7, cools coil ends of the stator coil 21, and is discharged externally through the front-end discharge apertures 1b.

In an alternator according to this embodiment, the terminal connection portion 40 is configured such that the first terminals 36 of the first unidirectional conducting element bodies 31 and the second terminals 37 of the second unidirectional conducting element bodies 33 are connected adjacently to the inner circumferential side surfaces of the radially inner end portions of the respective circuit board terminals 35, and the first and second terminals 36 and 37 can be welded simultaneously to the circuit board terminals 35 by moving the electrodes 64 and 65 in a single direction so as to press on the first and second terminals 36 and 37, improving welding workability.

Because the circuit board terminals 35 of the circuit board 34 are disposed on the edge surface of the molded resin portion 60 without the radially inner end portions of the circuit board terminals 35 projecting radially inward from the molded resin portion 60, resistance to cooling airflows that are generated by the rotation of the rear-end fan 8 and wind noise are reduced.

The terminal connecting portion 40 is disposed on the inner circumferential side surface of the circuit board 34, and as indicated by the arrows A in FIG. 1, external air that has entered through the rear-end suction apertures 2a passes through the terminal connecting portion 40 and is discharged externally through the rear-end discharge apertures 2b, suppressing temperature increases in the first unidirectional conducting element bodies 31 and the second unidirectional conducting element bodies 33.

Moreover, if the terminal connection portion is disposed radially outside the rear-end centrifugal fan, external air coming centrifugally from the centrifugal fan will strike the terminal connection portion directly, further suppressing temperature increases in the first unidirectional conducting element bodies and the second unidirectional conducting element bodies.

Since the fans 7 and 8 have annular plates 70 and 71 that are fixed to the end surfaces of the rotor 6, interference noise that arises due to the rotation of the rear-end fan 8 that would result from the circuit board 34 having an irregularly shaped surface is reduced by a flow-straightening action of the plate 71 on the rear-end fan 8 that faces the circuit board 34.

Because the terminal connection portion 40 is configured by extending axially and connecting the first terminals 36 of the first unidirectional conducting element bodies 31 and the circuit board terminals 35 and the second terminals 37 of the second unidirectional conducting element bodies 33 and the circuit board terminals 35, respectively, temperature increases in the first unidirectional conducting element bodies 31 and the second unidirectional conducting element bodies 33 are further suppressed since the terminal connection portion 40 receives more external air flowing radially as can be seen from the arrows A.

Because the horseshoe-shaped second heat sink 32 is disposed radially outside the horseshoe-shaped first heat sink 30, lengths of the respective terminals 36 and 37 of the first unidirectional conducting element bodies 31 and the second unidirectional conducting element bodies 33 can be made approximately equal, enabling the first unidirectional conducting element bodies 31 and the second unidirectional conducting element bodies 33 to be cooled in a well-balanced manner through the terminals 36 and 37.

Because an outer circumferential portion of the second heat sink 32 is in surface contact with the rear bracket 2, heat from the second heat sink 32 is discharged externally through the rear bracket 2 efficiently by thermal conduction.

Because the first heat sink 30 and the second heat sink 32 are made of aluminum, thermal conductivity is higher and cost is lower than for copper, reducing manufacturing costs proportionately.

Because the first unidirectional conducting element bodies 31 are joined to the first heat sink 30 by brazing using a solder, and the second unidirectional conducting element bodies 33 are also joined to the second heat sink 32 by brazing using a solder, heat from the first unidirectional conducting element bodies 31 and the second unidirectional conducting element bodies 33 is smoothly transferred by thermal conduction to the first heat sink 30 and the second heat sink 32, respectively.

Because the terminal connection portion 40 is formed by resistance welding, comparatively inexpensive equipment can be used to perform the welding operations.

Because lead wire connection portions 50 in which lead wires 38 of the stator coil 21 and the terminals 35 of the circuit board 34 are connected project outward near the rotor 6, the lead wire connection portions 50 are also cooled by external air that has entered through the rear-end suction apertures 2a in a similar manner to the terminal connection portion 40, also suppressing temperature increases in the first unidirectional conducting element bodies 31 and the second unidirectional conducting element bodies 33, as well as in the stator coil 21.

Moreover, in the above embodiment, an explanation has been given for an automotive alternator, but the present invention can of course also be applied to other alternating-current generators that are driven to rotate using an internal combustion engine other than a vehicle-mounted engine, or using an electric motor, or a water wheel, etc., as a driving source.

The heat sinks 30 and 32 are described as being made of aluminum, but of course they are not limited to this material, and may also be made of copper, for example.

The terminal connection portion 40 may also be formed using TIG welding instead of resistance welding.

The terminal connection portion 40 and the lead wire connection portions 50 may also be crimped, then joined by brazing using a solder.

A solder was used as a brazing filler material to fix the first unidirectional conducting element bodies 31 to the first heat sink 30 and to fix the second unidirectional conducting element bodies 33 to the second heat sink 32, but of course the brazing filler material is not limited to solders.

The present invention can of course also be applied to alternator rectifiers in which the first heat sink and the second heat sink are disposed so as to be separated from each other axially, and to alternator rectifiers placed in close contact with each other with an insulating sheet interposed.

What is claimed is:

1. An alternator comprising:
   a case;
   a rotor that is disposed inside said case, that is fixed to a shaft, and that has a fan that is disposed on an axial end portion;
   a stator that is disposed so as to surround said rotor and in which alternating current is generated due to a rotating magnetic field from said rotor; and
   a rectifier that is disposed near an end portion of said shaft and that rectifies said alternating current that is generated in said stator,
   said alternator being characterized in that:
   said rectifier includes:
   a first heat sink;
   first unidirectional conducting element bodies that are disposed on a front surface of said first heat sink so as to be spaced apart;
   a second heat sink that is disposed so as to be separated from said first heat sink;
   second unidirectional conducting element bodies that are disposed on a front surface of said second heat sink so as to be spaced apart; and
   a circuit board that has a circuit board terminal by which said first unidirectional conducting element bodies and said second unidirectional conducting element bodies are connected so as to constitute a bridge circuit; and
   a terminal connection portion is configured by respectively connecting first terminals of said first unidirectional conducting element bodies that have been led out and second terminals of said second unidirectional conducting element bodies that have been led out adjacently in a common plane with said circuit board terminal.

2. An alternator according to claim 1, characterized in that said circuit board comprises a molded resin portion that is integrated with said circuit board terminal, and said circuit board terminal is disposed on an edge surface of said molded resin portion.

3. An alternator according to claim 1, characterized in that said fan is a centrifugal fan, and said terminal connection portion is disposed radially outside said centrifugal fan.

4. An alternator according to claim 1, characterized in that said fan has an annular plate that is disposed on an end portion near said circuit board.

5. An alternator according to claim 1, characterized in that said first heat sink and said second heat sink each have a horseshoe shape, and said second heat sink is disposed radially outside said first heat sink.

6. An alternator according to claim 1, characterized in that an outer circumferential portion of said second heat sink is in surface contact with said case.

7. An alternator according to claim 1, characterized in that said first heat sink and said second heat sink are made of aluminum.

8. An alternator according to claim 1, characterized in that said terminal connection portion is formed by resistance welding.

9. An alternator according to claim 1, characterized in that said terminal connection portion is formed by connection using tungsten-arc inert gas-shielded (TIG) welding.

10. An alternator according to claim 1, characterized in that a lead wire connection portion in which a lead wire of said stator is connected to said circuit board terminal of said circuit board projects outward near said rotor.

\* \* \* \* \*